United States Patent [19]

Ogura et al.

[11] Patent Number: 4,561,044

[45] Date of Patent: Dec. 24, 1985

[54] LIGHTING DEVICE FOR A DISPLAY PANEL OF AN ELECTRONIC DEVICE

[75] Inventors: Takashi Ogura; Toshihide Hirohara; Masaaki Matsunaga; Kiyoshi Kamiya; Tetsuo Tanaka, all of Tokorozawa, Japan

[73] Assignee: Citizen Watch Co., Ltd., Tokyo, Japan

[21] Appl. No.: 663,689

[22] Filed: Oct. 23, 1984

[30] Foreign Application Priority Data

Oct. 28, 1983 [JP] Japan ................ 58-202182
Nov. 15, 1983 [JP] Japan ................ 58-176137
Dec. 28, 1983 [JP] Japan ................ 58-245186

[51] Int. Cl.$^4$ .......................................... H05B 33/12
[52] U.S. Cl. .................................. 362/84; 315/169.3; 340/781; 350/345; 358/241; 362/135
[58] Field of Search ............... 362/84, 135, 260; 350/345; 358/241, 254; 340/781; 315/169.3

[56] References Cited

U.S. PATENT DOCUMENTS

| | | | |
|---|---|---|---|
| 3,012,164 | 12/1961 | Franzone et al. | 362/84 X |
| 4,089,045 | 5/1978 | Mars | 362/84 X |
| 4,138,620 | 2/1979 | Dickson | 362/84 X |
| 4,238,793 | 12/1980 | Hochstrate | 350/345 X |
| 4,403,216 | 9/1983 | Yokoi | 350/345 X |

*Primary Examiner*—Tony M. Argenbright
*Attorney, Agent, or Firm*—Birch, Stewart, Kolasch & Birch

[57] ABSTRACT

A liquid crystal display panel is hinged on a body comprising a case provided with an electric circuit therein. On the case, a mirror is provided for watching an image on the liquid crystal display panel by the light passing through the display panel. An electroluminescence device is detachably provided in a receptacle in the case. The electroluminescence device can be positioned at a position adjacent the liquid crystal display panel so as to light the panel.

6 Claims, 17 Drawing Figures

FIG.1

PRIOR ART

LIGHTING DEVICE FOR A DISPLAY PANEL OF AN ELECTRONIC DEVICE

BACKGROUND OF THE INVENTION

The present invention relates to a lighting device for a display panel provided in an electronic device, such as a liquid crystal television, and more particularly to a lighting device for a liquid crystal display panel of the type the visibility of the image on which is increased by the light passing through the display panel.

Recently, a portable or pocketable electronic device such as a television set or video game employed with a liquid crystal display device has been developed.

Figure 1:
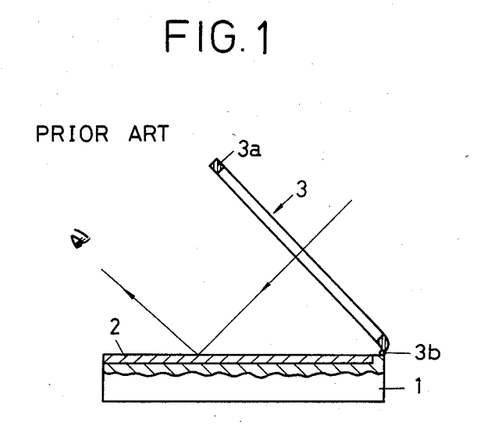
FIG. 1 is a sectional view showing a conventional television set employed with a liquid crystal display panel.

FIG. 1 shows a conventional portable television set provided with a liquid crystal display device. The television set comprises a body 1 for packaging driving mechanisms (not shown) such as an electronic circuit, batteries, and others, a mirror 2 mounted on the surface of the body 1, and a transparent liquid crystal display panel 3 which comprises a frame 3a and a liquid crystal display device (not shown) provided in the frame. The frame 3a is pivotally connected to one side of the top of the body 1 by a hinge 3b. The liquid crystal display panel 3 is opened about the hinge 3b and adapted to be held in a slanted position at a predetermined angle.

When watching the television, a user opens the display panel 3 and looks at an image reflected on the mirror 2 by transmission light as shown by the arrow.

However, in such a device, in case outside light is lacking, a clear picture is not reflected on the mirror 2, because the liquid crystal display device is a non-light-emitting type display device.

SUMMARY OF THE INVENTION

An object of the present invention is to provide a lighting device for a liquid crystal display panel provided in an electronic device which produces a clear picture in the dark.

Another object of the present invention is to provide a lighting device which may improve reliability and decrease the thickness of the device.

According to the present invention, there is provided a lighting device for an electronic device having a body comprising a case provided with an electric circuit therein, a liquid crystal display panel provided on the case, and a mirror for watching an image on the liquid crystal display panel by the light passing through the display panel. The lighting device comprises an electroluminescence device detachably provided in the case, first means for supplying a current from the electric circuit to the electroluminescence device, and second means for positioning the electroluminescence device at a position adjacent the liquid crystal display panel so as to light the panel.

In another aspect of the present invention, the liquid crystal display panel is hinged on the case at one end thereof and held in a slanted position, and a third means is provided for receiving the electroluminescence device in the case.

These and other objects and features of the present invention will become more apparent from the following description with reference to the accompanying drawings.

DESCRIPTION OF THE PREFERRED EMBODIMENTS

Figure 2:
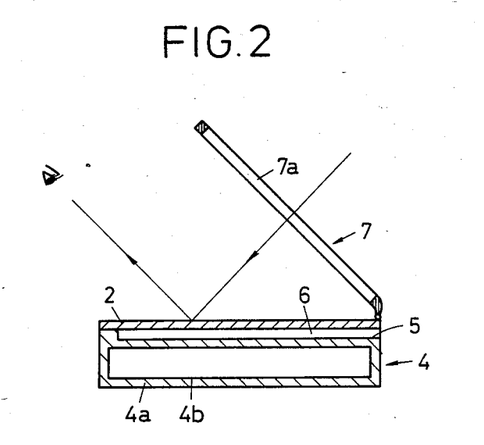
FIGS. 2 and 3 are sectional views respectively showing a television set provided with a lighting device for a liquid crystal display panel according to the present invention.
Figure 3:
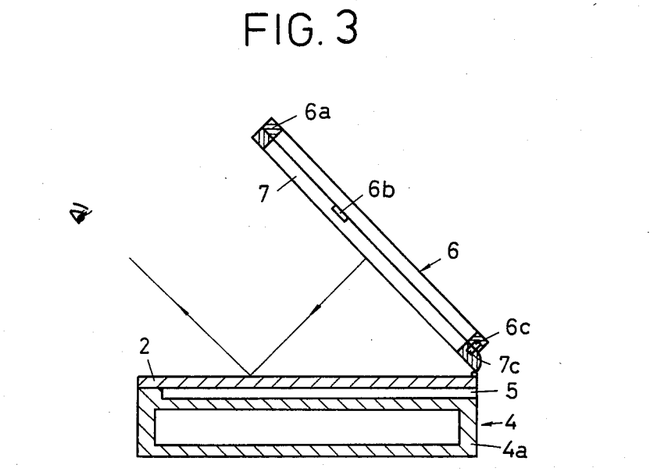

Referring to FIGS. 2 and 3 showing a television set according to the present invention, a television body 4 has a case 4a for packaging an electric circuit unit 4b and other devices which will be described hereinafter, and a recessed receptacle 5 formed on the case 4a for receiving a lighting device 6. The mirror 2 which is the same as the structure of FIG. 1 is mounted on the case 4a. A liquid crystal display panel 7 comprises a frame 7a and liquid crystal display device provided in the frame. The liquid crystal display panel is hinged on the case 4a in the same manner as described in FIG. 1.

The lighting device 6 consists of and electroluminescence decides (hereinafter called EL) comprising an electroluminescent material sealed between a pair of transparent metal electrodes secured to a frame 6a.

As shown in FIG. 2, when surrounding outside light is sufficiently bright, a clear image is produced in the same manner as described in FIG. 1.

Referring to FIG. 3, in case the outside light is lacking, the lighting device 6 with EL which is received in the receptacle 5 is pulled out, and disposed on the upper side of the liquid crystal display panel 7. A pair of engaging lugs 6b are provided on opposite sides of the frame 6a of the lighting device 6, while a pair of engaging projections (not shown) corresponding to engaging lugs 6a are formed on the frame of the display panel 7. Further, a contact 6c provided on the lighting device 6 is connected to a contact 7c correspondingly provided on the display panel 7, so as to supply a current from a source in the body 4 to the lighting device 6.

The lighting device 6 with EL emits the light to illuminate the liquid crystal display panel 7 from a rear side thereof so that a clear image is produced by the transmission light.

Figure 4A:
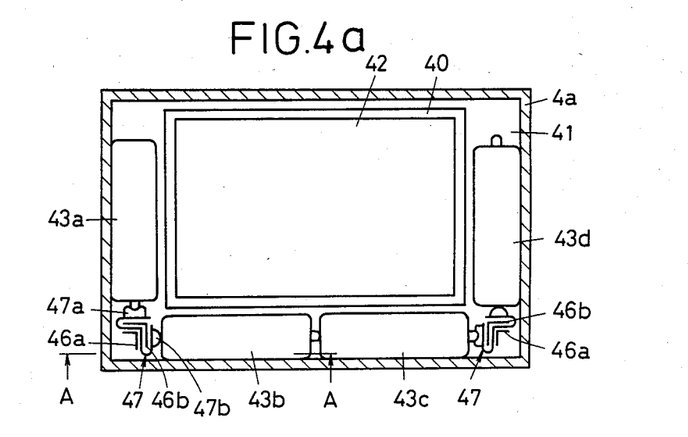
FIG. 4(a) is a sectional plan view showing an arrangement of electronic circuit unit and other devices of the television set of FIG. 2.

FIG. 4(a) shows an internal structure of the television body 4. A substrate 40 having a rectangular shape is disposed on the bottom of the case 4a at a central and biased portion to form a U-shaped space 41 in the case 4a. An electric circuit block 42 is mounted on the substrate 40. Four batteries 43a, 43b, 43c and 43d are disposed in the space 41 surrounding the substrate 40 and are connected in series for supplying a current to the electric circuit in the block 42.

Figure 4B:
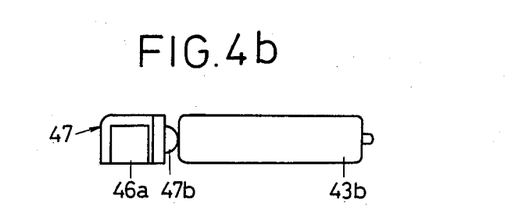
FIG. 4(b) is a sectional view taken along the line A—A of FIG. 4(a)

In order to make electrical connections between the batteries 43a and 43b and between batteries 43c and 43d at both corners, a pair of L-shaped holding members 46a, 46b are projected from the bottom of the case 4a at each corner to form an L-shaped groove there-between. A flexible conductive connecting member 47 made of spring plate is engaged in each groove. The connecting member 47 has a recessed contact member 47a at one end thereof and a projected contact member 47b at the other end. The contact member 47a is engaged with a plus pole of the battery and the contact member 47b is engaged with the minus pole. Thus, batteries engaged with flexible connecting members are connected in series.

Figure 5:
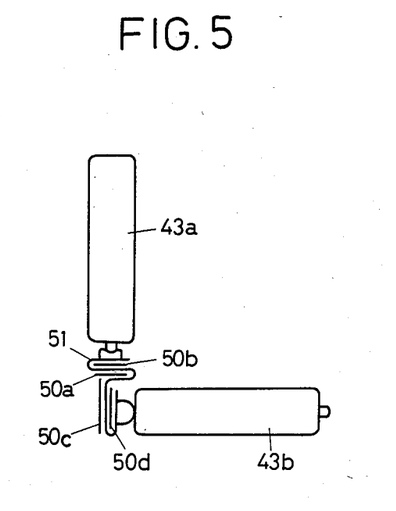
FIGS. 5 and 6 are plan views each of which shows a part of a further example of connecting members for batteries.
Figure 6:
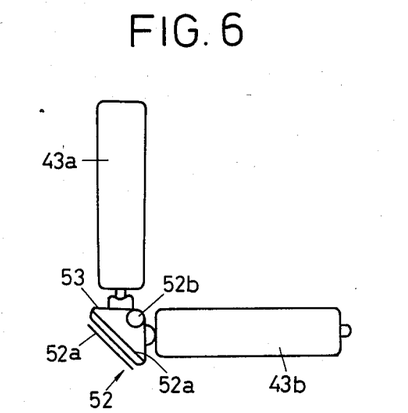

FIGS. 5 and 6 show further modifications of connecting members.

As shown in FIG. 5, a pair of projections 50a and 50b and a pair of projections 50c and 50d are provided on the bottom of the case 4a with the perpendicular disposition to each other. A flexible conductive connecting member 51 is engaged with grooves formed between projections 50a and 50b, 50c and 50d.

Referring to FIG. 6, a connecting unit 52 comprises a pair of projections 52a forming a groove and a cylindrical member 52b. A flexible conductive connecting member 53 has a triangular shape so as to engage with the groove between the projections 52a and the cylindrical member 52b.

Figure 7A:
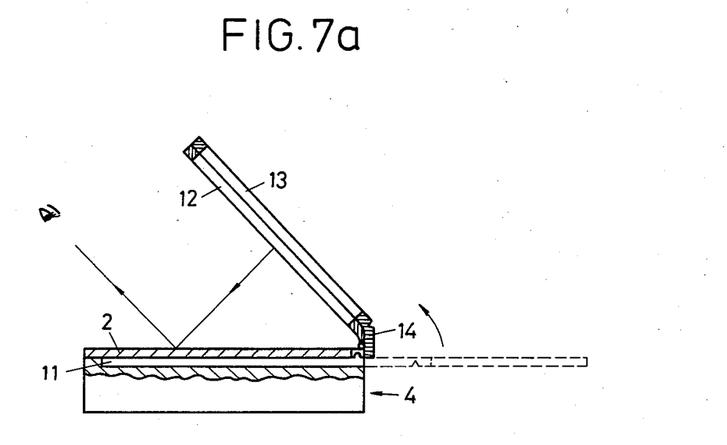
FIG. 7(a) is a sectional view of a second embodiment of the present invention.
Figure 7B:
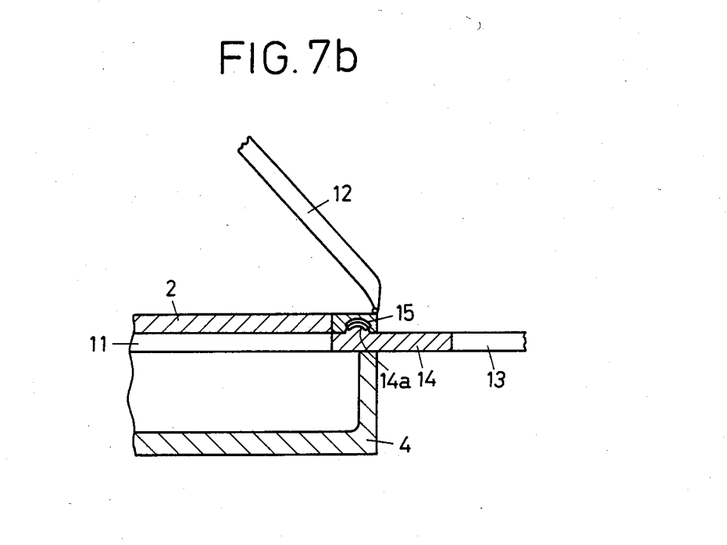
FIG. 7(b) is a partly enlarged sectional view showing the embodiment of FIG. 7(a)

Referring to FIGS. 7(a) and 7(b) showing a second embodiment of the present invention, a lighting device 13 with EL has a flexible end portion 14 provided with a contact 14a. A contact 15 is provided in an edge portion of a receptacle 11. Other parts are the same as the structure of FIG. 2.

When light is lacking, the lighting device 13 is pulled out from the receptacle 11 as shown in FIG. 7b. When the lighting device is entirely pulled out, the contact 14a projects at the edged portion to engage with contact 15 to make the switch. Then, the lighting device 13 is turned onto a display panel 12, so that the lighting device is put on the display panel.

Figure 8:
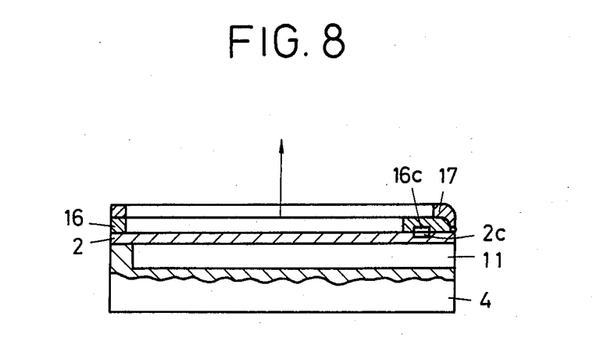
FIG. 8 is a sectional view showing a third embodiment of the present invention.

FIG. 8 shows a third embodiment of the present invention. In order to improve brightness for producing a clear image, an EL lighting device 16 is removed from the receptacle 11 and is disposed on the mirror 2 and covered with a liquid crystal display panel 17. A contact 2c provided on the mirror 2 is connected to a contact 16c correspondingly provided on the lighting device 16 so that the lighting device 16 directly illuminates the display panel 17 from the underside thereof.

Referring to FIGS. 9 to 12 showing a fourth embodiment of the present invention, a television case 18a is formed with a recess 18b on a surface for receiving a panel member 20 as a lighting device.

Figure 10:
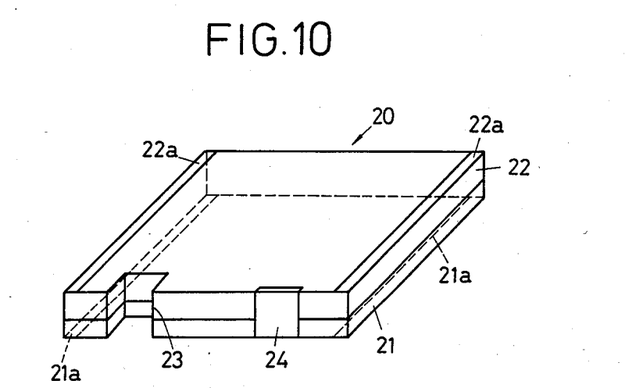
FIG. 10 is a perspective view showing a panel member employed in the embodiment of FIG. 9.

Referring to FIG. 10, the panel member 20 comprises a mirror 21, an EL lighting device 22 secured to a rear side of the mirror 21. A recess 23 is formed on one side of the panel member 20, and a contact 24 is also provided on the side. A pair of groundings 21a and a pair of groundings 22a are provided on opposite sides of each surface of the mirror 21 and the lighting device 22, respectively. Corresponding grounds 21a and 22a are electrically connected with each other.

Figure 11A:
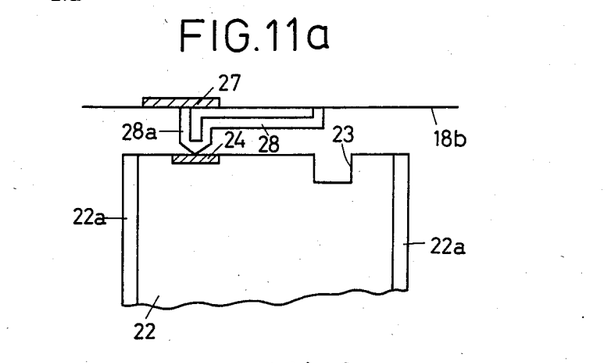
FIGS. 11(a) and 11(b) are plan views showing contact structures of FIG. 9.
Figure 11B:
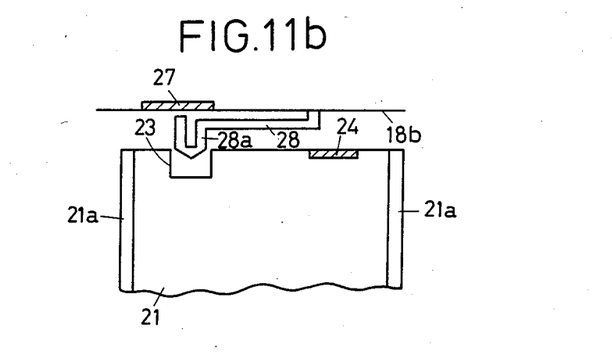

FIGS. 11(a) and 11(b) show a contact structure for the panel member 20. A contact 27 is provided on a vertical side wall of the recess 18b so as to be connected with the contact 24 of the panel member 20 through a spring plate 28. The spring plate 28 having a connecting end portion 28a is secured to the vertical side wall adjacent to the contact 27.

Figure 9A:
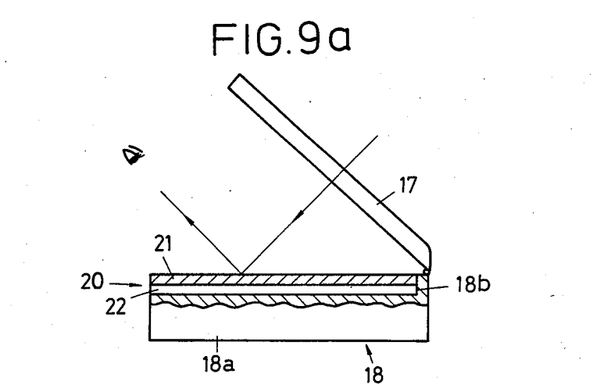
FIGS. 9(a) and 9(b) are sectional views each showing a fourth embodiment of the present invention.
Figure 9B:
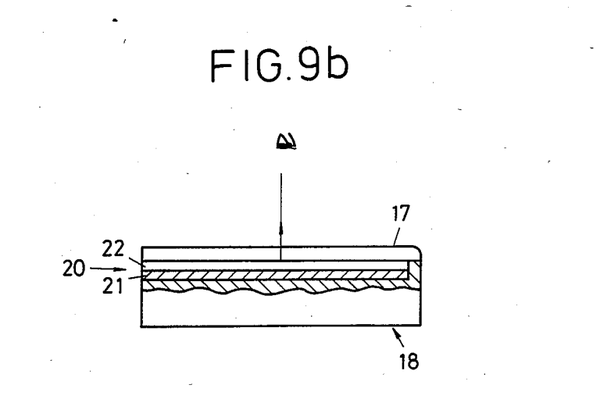

Referring to FIG. 9(b), when the outside light is defficient, the panel member 20 is put in the recess 18b in the inverted position in which the lighting device 22 faces to the outside and the mirror 21 faces to the bottom. As shown in FIG. 11(a), at the innermost portion of the recess 18b, the contact 24 engages with an end portion of the connecting end portion 28a of the spring plate 28 to bias the spring plate 28 to the contact 27, so that the other end portion of the connecting end portion 28a is engaged with the contact 27. Thus, the lighting device 22 is driven to emit the light, whereby the liquid crystal display panel 17 disposed on the EL lighting device 22 produces a clear picture.

On the contrary, as shown in FIG. 9(a), when the outside light is sufficient, the panel member 20 is put in the recess 18b in the normal position in which the mirror 21 is faced to the outside. Thus, an image is reflected on the mirror 21 in the same manner as described in FIG. 1. In this state, as shown in FIG. 11(b), the contact 24 is positioned far distant from the contact 27. The end portion 28a of the spring plate 28 is engaged with the recess 23. Thus, since contacts 24, 27 are not connected each other, the lighting device 22 does not emit the light.

Figure 12A:
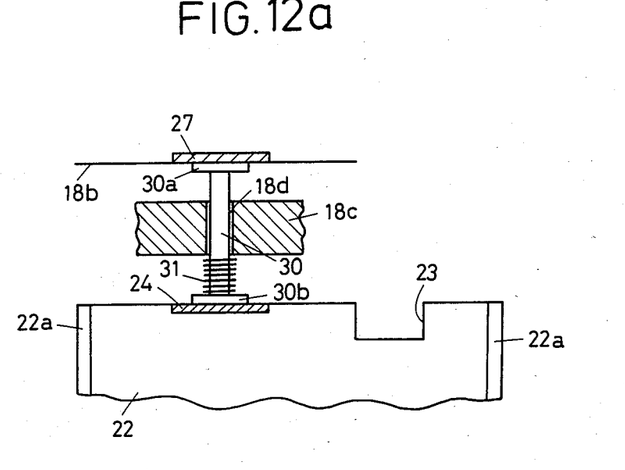
FIGS. 12(a) and 12(b) are plan views each showing another example of the contact structure of the embodiment of FIG. 9.
Figure 12B:
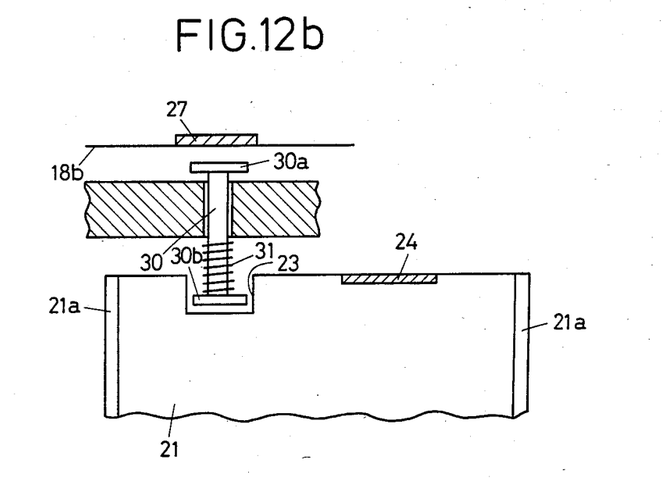

FIGS. 12(a) and 12(b) show another example of a contact structure in which a rod 30 having a coil spring 31 is employed in place of the spring plate 28 of FIG. 11.

The rod 30 has a pair of contact heads 30a and 30b provided on opposite ends thereof and is slidably engaged with a hole 18d formed in a frame 18c. The coil spring 31 is provided around the rod 30 at a portion between the head 30b and frame 18c. As shown in FIG. 12(a), when the contact 24 is engaged with the head 30b, the coil spring 31 is compressed and the other head 30a engages with the contact 27. As shown in FIG. 12(b), when the head 30b engages with the recess 23, the coil spring 31 expands so that the contact head 30a does not engage with the contact 27.

While the invention has been described in conjunction with preferred specific embodiments thereof, it will be understood that this description is intended to illustrate and not limit the scope of the invention, which is defined by the following claims.

What is claimed is:

1. An improved lighting device for an electronic device having a body comprising a case provided with an electric circuit therein, a liquid crystal display panel provided on the case and a mirror for watching an image on the liquid crystal display panel by the light passing through the display panel, wherein the improvement comprising:

an electroluminescence device detachably provided in the case;

first means for supplying a current from the electric circuit to the electroluminescence device;

second means for positioning the electroluminescence device at a position adjacent the liquid crystal display panel so as to light the panel.

2. The lighting device according to claim 1 wherein the liquid crystal display panel is hinged on the case at one end thereof and held in a slanted position.

3. The lighting device according to claim 2 further comprising third means for receiving the electroluminescence device in the case.

4. The lighting device according to claim 3 wherein the electroluminescence device is attached to the upper surface of the liquid crystal display panel.

5. The lighting device according to claim 3 wherein the electroluminescence device is positioned in a position adjacent the underside of the liquid crystal display panel disposed in the horizontal position.

6. The lighting device according to claim 3 wherein the electroluminescence device is attached to the rear side of the mirror to form a panel member and the panel member is so arranged as to be reversibly mounted on the case.

* * * * *